United States Patent [19]
Heitmann

[11] 3,814,958
[45] June 4, 1974

[54] VIBRATORY ALIGNMENT SYSTEM FOR LENSES IN MOUNTINGS

[75] Inventor: Knut Heitmann, Wetzlar, Germany

[73] Assignee: Ernst Leitz GmbH, Wetzlar, Germany

[22] Filed: Sept. 15, 1972

[21] Appl. No.: 289,348

[30] Foreign Application Priority Data
Sept. 27, 1971 Germany.......................... 2148102

[52] U.S. Cl............... 310/8.1, 29/243.54, 307/117, 307/119, 310/8.3, 310/8.7, 310/26, 318/116, 318/118, 340/248 R
[51] Int. Cl............................................. H01v 7/00
[58] Field of Search ............... 310/8.1, 8.3, 8.7, 26; 318/116, 118, 676, 686; 340/248 R; 307/116, 117, 119; 29/243.54

[56] References Cited
UNITED STATES PATENTS

| 3,444,390 | 5/1969 | Breidenbach et al............ | 310/8.1 X |
| 3,573,781 | 4/1971 | Shoh............................. | 310/8.1 X |
| 3,666,599 | 5/1972 | Obeda........................... | 310/8.1 UX |

FOREIGN PATENTS OR APPLICATIONS
1,004,516  8/1957  Germany

Primary Examiner—J. D. Miller
Assistant Examiner—Mark O. Budd
Attorney, Agent, or Firm—Krafft & Wells

[57] ABSTRACT

Apparatus and method for centering of lenses in the bell tension method in which the alignment of the lens is achieved by vibration at a high frequency.

7 Claims, 2 Drawing Figures

VIBRATORY ALIGNMENT SYSTEM FOR LENSES IN MOUNTINGS

BACKGROUND OF THE INVENTION

The field of the invention is abrading processes for lenses. It is known in the manufacture of quality lens systems, such as for grinding the edges, that the centering of each lens plays an important role.

Centering of spherical lenses which are regular and rotationally symmetrical serves to limit the quality of the system. The rotation axis of the lens must so far as is possible coincide with the optical axis of the lens system. Alignment of lenses in or on mountings is often referred to in the art as "centering". Two methods are basically used for this purpose.

In one method the lens is adhered to the holder of a spindle and by slow rotation under optical control is moved until its optical axis coincides with the rotational axis of the spindle. This method permits a high degree of accuracy, however, it is a costly method for achieving the desired alignment.

By another so-called "bell-centering" method, as disclosed in German Published Application 1,004,516, the lenses are placed between two tension bells whose axes are concentric. The bell rims press against the spherical lens and automatically align it in the desired position. The accuracy of centering of a lens by the "bell tension" method depends upon a plurality of factors, such as the radius of curvature, the diameter of the bell, as well as the coefficient of friction between the bell and the lens. German Published Application 1,004,516 teaches a method of centering of a lens using tension bells which during the centering are vibrated along the rotational axis. Ultrasonic frequency vibration is used for this purpose. A disadvantage of this method is that upon first contact of the lens and the vibrating bell, damage may occur which is apparent only after the centering operation is finished.

SUMMARY OF THE INVENTION

It is an object of the invention to improve the above-mentioned "bell tension" method such that damage from the vibrating bell will not occur.

The solution of this problem is achieved by a control circuit which is used to regulate vibration energy to depend upon the tension pressure of the vibrating bell against the lens, and in addition, automatically breaks the circuit when the vibration energy exceeds a predetermined value.

A further modification of the invention provides for a control circuit for the vibration energy from the beginning to the end of the centering operation. In this method, in addition to the vibration energy being dependent upon pressure, time control is also employed. The bell first contacts the lens by hand or preferably automatically, after which the bell is energized. Advantageously an electromechanical vibrator is used to set the limits of vibration amplitude. A piezoelectric device is suitable for use as the electromechanical vibrator.

BRIEF DESCRIPTION OF THE DRAWINGS

Two embodiments of the invention are shown in the drawings, wherein.

DESCRIPTION OF THE PREFERRED EMBODIMENTS

Figure 1:
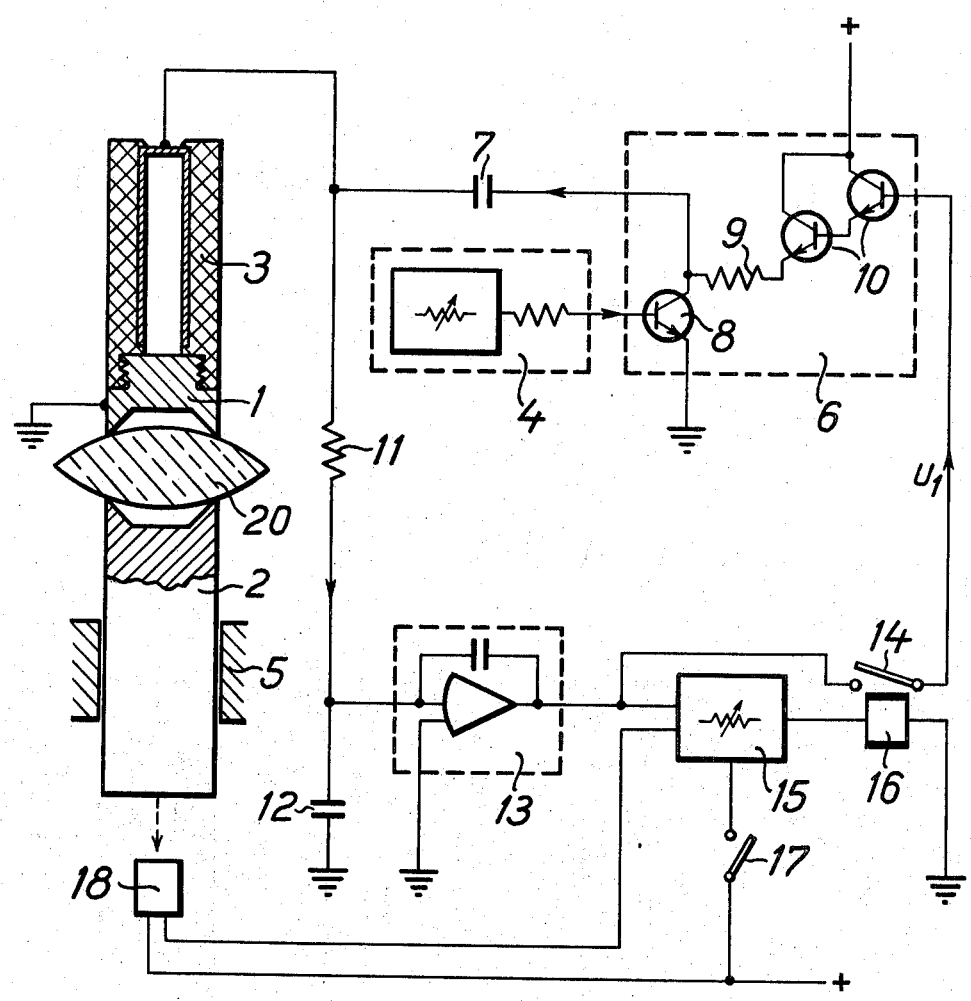
FIG. 1 shows in cross-section the bell rim centering apparatus and in plan view the associated circuitry.

In one embodiment of the present invention centering of lenses by the bell-tension method is carried out in which during the centering process the bell tension apparatus holding the lens is brought into a high frequency vibration wherein a control circuit is employed to limit the vibration energy to depend upon the pressure existing between the lens and the rim of the bell. This circuit also operates to automatically disconnect the apparatus from an electrical supply should pressure between the lens and bell exceed a predetermined value.

In another embodiment, the centering of the lenses by the bell-tension method is carried out wherein during the centering the bell tension apparatus is set into high frequency vibration and the vibration is controlled by a control circuit which controls the vibration energy to depend upon both time and pressure at the beginning as well as at the end of the centering operation.

In still another embodiment, the current feed for the vibration element of the bell tension device is first automatically actuated only after contact has been made by the rim of the bell with the lens being centered.

According to still another embodiment, an electromechanical vibrating element is employed to control the amplitude of the control voltage.

The embodiments can best be described by reference to the examples in the drawings, wherein:

FIG. 1 shows two rotationally symmetric tension bells 1 and 2 which, along their rotational axes, are movably mounted. The bell 1 is fixed to a piezoelectric element 3 which is activated by electric supply 4 comprising a frequency generator in series. The oppositely located bell 2 is positioned in guide 5. It can be moved by means of a tension mechanism such as a screw or hydraulic cylinder with a predetermined variable force along its rotational axis. The electric supply 4 controls the element 3 indirectly through an amplitide modulator 6 as well as a coupling condenser 7. The amplitude modulator 6 consists of a transistor 8 the base of which is switched by electric supply 4 and whose collector is connected through resistance 9, as well as a voltage follower switch 10 comprising two transistors, and control voltage $U_1$. Element 3 is further connected through a resistance 11 wherein this resistance 11 is in series with condenser 12.

Element 3 is further connected with the input of storage amplifier 13 comprising a charge amplifier (state of the art, consisting of an operational amplifier with capacitive feedback) the output of which through switch 14 gives the above-mentioned control voltage $U_1$ to the input of the amplitude modulator 6. The output of storage amplifier 13 is further connected to the input of a bistable threshold value switch 15. The output of switch 15 is connected to relay 16 which controls switch 14. By means of a hand actuated key 17, or by the lowering of the bell 2, automatically actuated contact 18 can reset the bistable threshold value switch 15 back to its locked out position. Contact 18 is automatically actuated by element 2 when it is in its lowered-end position.

The function of the above-described device is as follows:

Element 3 acts simultaneously as pressure measuring system and as vibrator. It transforms pressure powers into proportional electrical charge variations and charge variations into powers. Electrical alternating current signals are fed via the capacitor 7 to the element 3 energizing the latter to mechanical vibrations of ultrasonic frequency. Proportional d.c. signals are generated by the quasi-static pressure on element 3 which signals are fed to the storage amplifier 13 via the filter containing the elements 11, 12 which eliminate the a.c. portions on the common lead.

When not in use the switch 14 is closed, both bells 1 and 2 are positioned far enough apart from one another that a lens 20 laid on bell 2 makes no contact with bell 1. At this time element 3 is not in contact with the lens nor is there any charge flowing into the amplifier. Accordingly, the control voltage $U_1$ is zero. The result of this is that the output voltage of the modulator 6 is also equal to zero. When the bell 2 is moved upwardly in its guide, the lens 20 contacts bell 1 under pressure. This produces a voltage potential which flows to storage amplifier 13 and is modulated into a proportional control voltage $U_1$. The output of modulator 6 is an alternating current, the amplitude of which is a function of the pressure and proportional to the control voltage $U_1$. This output voltage brings the element 3 into mechanical vibration, the frequency of which is controlled by electric supply 4. Should the bell 2 be again forced upwardly with increasing pressure, the output voltage of the storage amplifier 13 increases until it reaches the switching potential of the threshold value switch 15 so that switch 14 opens. Thereby the vibrating potential to element 3 is cut off. In order to avoid damage from reinstigating the vibration frequency upon lowering bell 2 to remove a centered lens, the bistable threshold value switch must be locked out. One such switching means requires an unloading switch for which switches 17 or 18 can serve.

Figure 2:
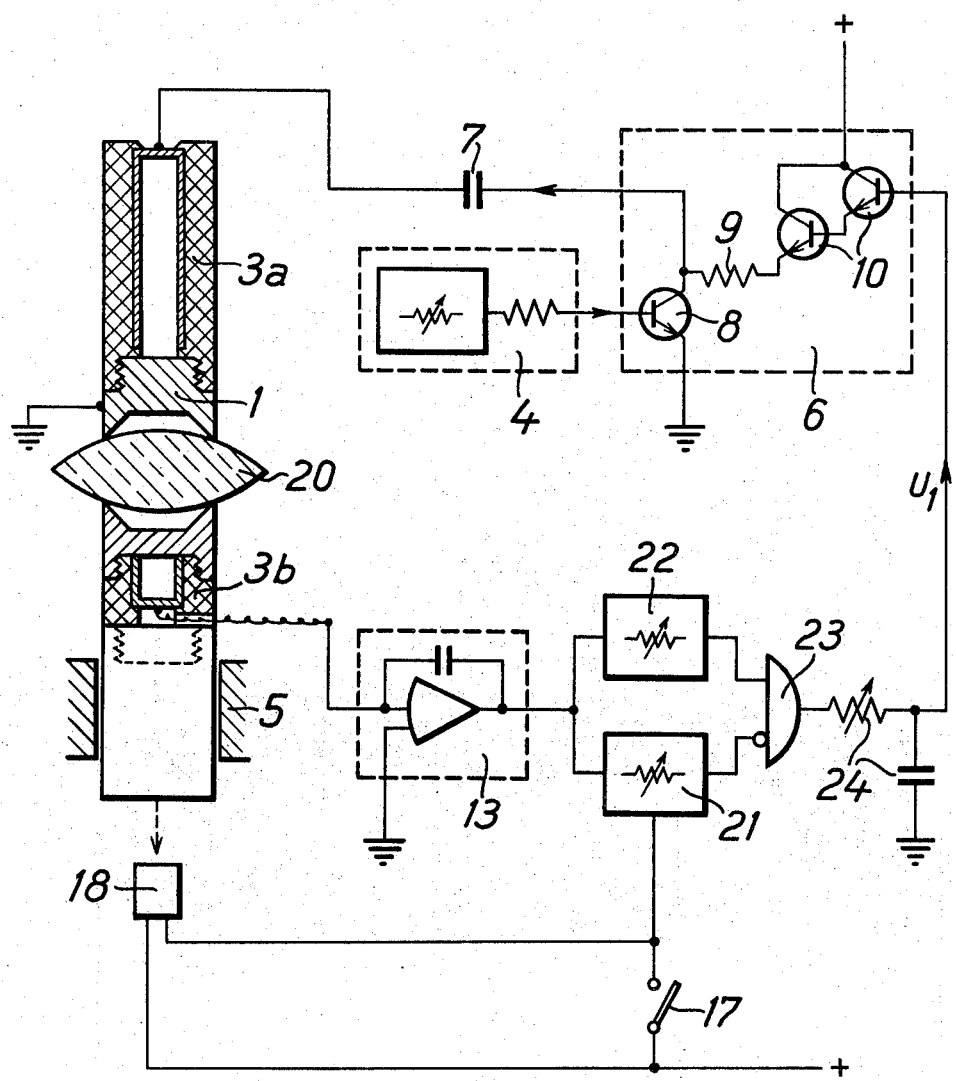
FIG. 2 shows in plan view a modification of the circuit of FIG. 1.

Modifications of the above-described inventive arrangement are possible. One can, e.g., as shown in FIG. 2, connect the output of the storage amplifier 13 simultaneously to two bistable threshold value switches 21 and 22 connected in parallel. Switch 21 of these opens as above described upon the occurrence of high pressure and the electrical potential produced thereby. This occurs by means of an AND-Gate 23. The switch 22 conducts at a lower initial threshold value to instigate the beginning of the feed of the increasing control voltage into the amplitude modulator 6 as control voltage $U_1$ by means of a time control circuit 24, comprising a capacitor and a variable resistor.

It is also possible to use two piezoelectric elements 3a and 3b in connection with the tension bells, one of which elements is coordinated to the tension bell 1 and the other one is coordinated to the tension bell 2, this being also illustrated in FIG. 2. The element 3a acting as vibrator is supplied with energy via the capacitor 7 whereas the element 3b acting as pressure measuring system is connected to the input of the storage amplifier 13.

I claim:
1. An apparatus for centering a lens comprising: first and second opposed bell holders for a lens; pressure responsive electromechanical and electric means attached to said first holder for generating an electric current which is proportional to the pressure applied; means for urging said holders in the direction of one another; means for vibrating said holders at a high frequency attached to said second holder; and control circuit means connected to said electromechanical and electric means for generating a start signal to said means for vibrating at an initiating pressure and with a timing circuit means connected to said means for vibrating for generating a stop signal at a predetermined time.

2. The apparatus of claim 1, wherein said pressure responsive electromechanical means and said means for vibrating are piezoelectric elements.

3. The apparatus of claim 1, wherein said control circuit includes means for generating amplitude modulating signals to said means for vibrating.

4. An apparatus for centering a lens comprising: first and second opposed bell holders for a lens; pressure responsive electromechanical and electric means attached to said first holder for generating an electric current which is proportional to the pressure applied; means for urging said holders in the direction of one another; said pressure responsive means including means for vibrating said holders at a high frequency; and control circuit means connected to said electromechanical and electric means for generating a start signal to said means for vibrating at an initiating pressure and a stop signal to said means for vibrating when a predetermined value is exceeded.

5. The apparatus of claim 4, wherein said control circuit means has first and second parallel paths, said first parallel path having therein an amplitude modulator and a frequency generator in series for generating said start signal and said second parallel path having a storage amplifier and a bistable threshold value switch in series for generating said stop signal.

6. The apparatus of claim 1, wherein said control circuit includes a first path having therein am amplitude modulator and a frequency generator in series for generating said start signal and a second path having therein a storage amplifier, a plurality of bistable threshold value switches and said time control circuit for generating said stop signal, said first and second paths in series.

7. The apparatus of claim 4, wherein said pressure responsive electromechanical and electric means is a piezoelectric element.

* * * * *